May 26, 1931. W. V. HOEFEN 1,807,211
CONVEYER MECHANISM
Filed March 26, 1930  3 Sheets-Sheet 3

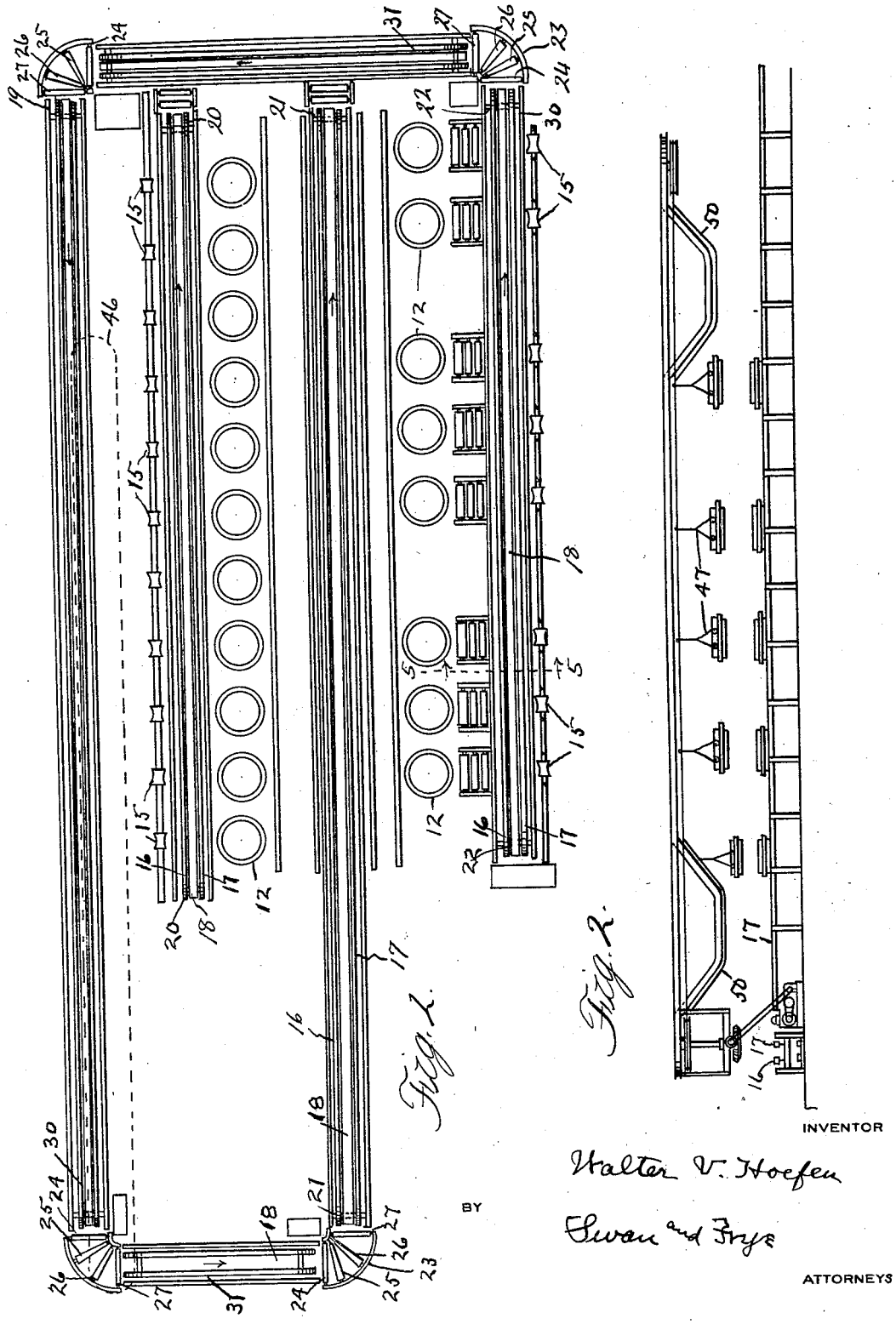

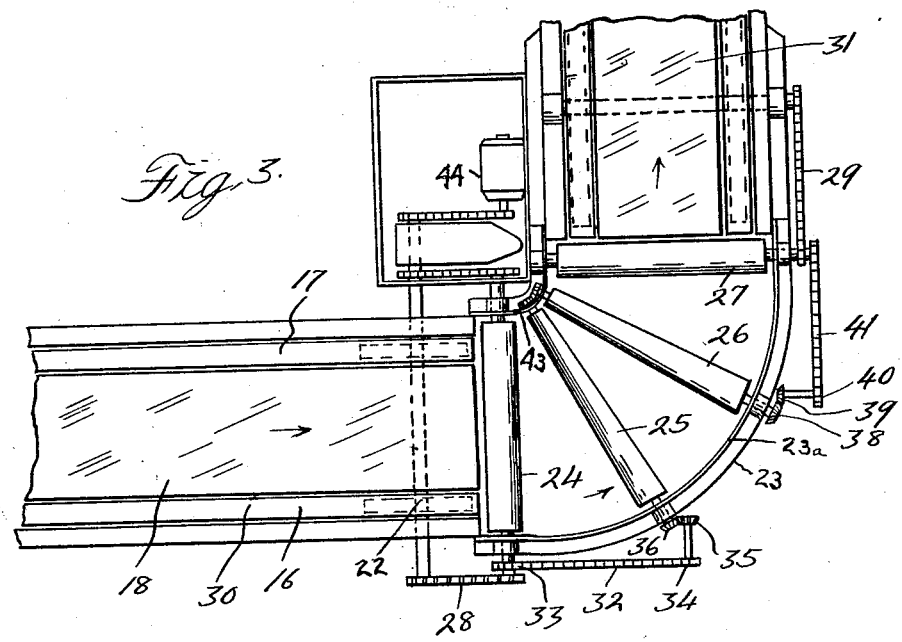
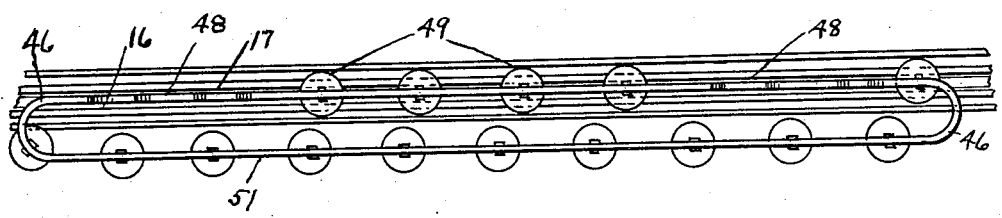

INVENTOR
Walter V. Hoefen
by Swan and Frye
ATTORNEYS

Patented May 26, 1931

1,807,211

UNITED STATES PATENT OFFICE

WALTER V. HOEFEN, OF DETROIT, MICHIGAN, ASSIGNOR TO BROWN-HUTCHINSON IRON WORKS, OF DETROIT, MICHIGAN, A CORPORATION OF MICHIGAN

CONVEYER MECHANISM

Application filed March 26, 1930. Serial No. 439,206.

This invention relates to an improved conveyer system adapted especially for the economical and efficient handling of tire molds, though by no means restricted in use thereto, and has for its object an improved organization of parts by means of which the stacks of two-piece molds, which, in present tire manufacturing practice, are hoisted upwardly from the treating oven by means which need here be described only casually, may be caused to travel over a predetermined route, at selected points along which they are subjected to temporary disassemblage and subsequent restoration to position, after which they are delivered at points located conveniently adjacent other treating ovens or the like for final curing or other process steps.

Both because of the number of molds handled per unit of time, and because of the heat thereof as they emerge from the treating ovens, it is desirable that so far as possible their handling, transfer, and conveyance from one point to another shall involve a maximum of mechanical handling and a corresponding minimum of physical attention by the workmen, and at the same time reliably accurate time intervals must be neither exceeded nor shortened, between the emergence of the tire molds from one heat-treating process and their subjection to the next heat-treating step, and it is the purpose of the improved construction herein disclosed to effectuate these several desired results with only a minimum of manual labor and irregularity which would cause time losses, but as well within a conveniently restricted area, both for factory layout reasons, and for reasons of accessability to the several series of heat-treating elements necessary to be employed. For the sake of clarity of illustration of the problems herein particularly dealt with, I shall include in the drawings, and to the degree necessary in the description, certain features of tire-handling mechanism now known and used in the art, but the particular feature herein proposed to be dealt with relates to the smooth and relatively unjarred conveyance of the tire molds and their contents, especially as regards the turning of corners in the conveyer system. Previous practice in this respect has involved the use of various endless belt elements operating along lines perpendicular to one another, and merely with reliance upon the provision of curved guides or limiting skirtings, in the plane of travel of the tire molds, at the point where their direction of travel changes because of their transference from one belt mechanism to another. This has involved an undesired amount of bumping or jarring of the molds and their contents, as well as calling for an additional and fractionally wasted quantity of power for the actuation of the conveyer elements, which it is the purpose of the construction herein described to avoid.

The improvements in the conveyer system's operation made possible by the use of my improved construction are of course of similar value to such other and analogous uses as the assembly of the parts of a motor or other engine unit, and indeed any similar manufacturing steps or processes wherein the regulated travel of an article is desired.

The details of the preferred form of chain and link mechanism herein illustrated for accomplishing the straight-away movement of the tire molds or other conveyed parts are reserved for and covered in a copending application for Letters Patent.

In the drawings:

Figure 1 is a plan view of my improved construction, showing the preferred relation of the conveyer elements and of the heat-treating units.

Figure 2 is an elevational view of my improved conveyer system in relation to the preferred means for effecting the timed separation of the tire mold units.

Figure 3 is a plan view on a larger scale than is shown in Figure 1, bringing out my preferred form of mechanism for operatively correlating, as regards the advancement of the tire mold units, the adjacent ends of two conveyer units which extend right angularly to one another.

Figure 4 is a top plan view of one of these conveyer units, with tire molds in place thereon.

Figure 5:
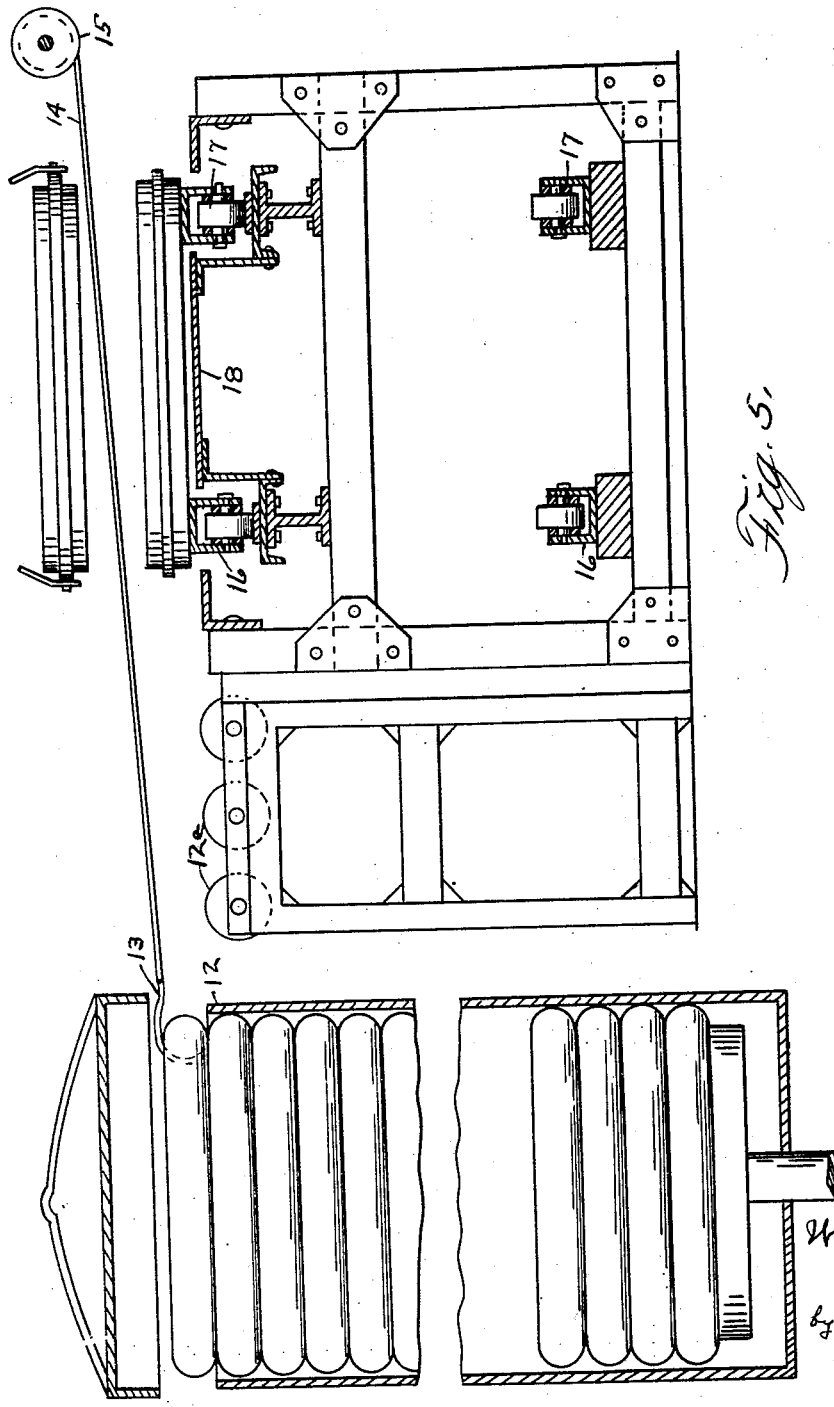
Figure 5 is a relatively large scale elevational view partly in section, taken along the line 5—5 of Figure 1, designed to bring out my preferred means of drawing over the tire mold unit or similar article to be handled one by one, from the heated stack on the conveyer, or other supply source.

At 12 are shown a series of tire-baking or curing elements, from the top of such ones as are at any time active are projected the initially "cooked" tire bodies and their holding molds, which are then drawn laterally from off the top of the stack, in the manner illustrated particularly in Figure 5, by means of a hook 13 on the end of a rope or chain 14 which passes over a suitable pulley 15. This operation locates the individual tire molds on the top of an endless-belt conveyer mechanism, the companion units of a preferred form of which, as 16 and 17, are shown cross sectionally in said Figure 5, and are spaced from one another according to the diameter of the tire mold to be handled, the top surface of each of these conveyer elements and of the constituents links thereof being located sufficiently above the plane of the fixed intermediate platform 18, so that the tire mold as it is carried by the conveyer belts is frictionally clear of the top of this table. As heretofore stated, the details of the preferred form of endless conveyer or chain which I here illustrate are reserved for, and covered in, a separate application, but like any other endless belt conveyer system, each series must pass over end rollers, as 19 and 20, and 21 and 22 respectively, the direction of travel of each series being substantially perpendicular to that of the other. The rollers 20 and 22 respectively are connected at their inner ends by suitable gearing, to an electric motor 44, positioned intermediate the ends of the angular conveyer belts, and adjacent the part 43, as clearly shown in Fig. 3. Previous practice has involved the positioning of one of these conveyer series across the end of the other, but this in turn has involved the location at the point where the desired change in the direction of travel of the tire mold takes place, of a curved skirting or fence, which I have indicated at 23 in Figure 3, so that as each tire mold or other object under conveyance has its further, belt-induced travel thus halted by the presence of this skirting at the level of its line of travel, it is bumped thereagainst, and, due to the continued frictional engagement of the end of the conveyer belt upon its under side combined with the curved contour of the fence or skirting, the article is with more or less promptness moved around to the point where its under surface encounters the frictional or drawing influence of the next conveyer unit, lengthwise of which it is thereafter carried. This method of effecting a change in the direction of travel is not only objectionable as regards the jarring of the tire mold and its contents, but it is unduly expensive and wasteful in the matter of the degree of power necessary to cause the continuance of the travel of the conveyer elements. The sole function of the part 23 herein illustrated should therefore be regarded only as the furnishing of a bearing support for the outer ends of the several angular rollers 24, 25, 26, and 27, the upstanding web portion 23ª representing for purposes of comparison only the objectionable features of the method heretofore followed for effecting the angular change in the direction of travel of the article advanced by the endless conveyers. The other ends of the angular rollers are journaled in the part 43.

To obviate these objections, I position the ends of a pair of endless belt units in the terminally contiguous relation shown in Figures 1 and 3, retaining their respective perpendicular positioning toward one another as regards the direction of travel of the upper or article-carrying surfaces thereof; thus the nearest corners of the respective endless belt mechanisms are not only actually out of contact with one another to the degree necessary to accommodate the journal rollers, gear wheels or other mechanism appurtenant to each, but the ends of the respective endless belt mechanisms, as viewed from above, constitute two right-angularly related boundaries of an included angular space, within which I journal, spacedly from one another, though all having their top surfaces in the same general plane with one another and with the top or article-carrying surfaces of the respective endless belt units, a plurality of roller elements, as 24, 25, 26 and 27, whose relation to one another as viewed from above may be generally described as fan-shaped. Each of the rollers 24 and 27 is operatively connected as by an endless sprocket chain, 28 or 29 respectively, with the drum or terminal gear wheels over which the adjacent end of one or the other of the endless belt units passes, thus receiving from it rotative movement in the direction which, frictionally engaging the under surface of articles fed onto it from the end of the delivery unit, as 30, tends to continue the travel thereof toward the next adjacent and acute angularly positioned roller as 25. This latter is in turn operatively connected with the gear wheel 34 just mentioned through the medium of the endless belt or sprocket chain 32, which, engaging over the sprockets 33 and 34 respectively, actuates the shaft of a bevel gear element 35, whose teeth mesh with those of a complementary bevel gear element 36 which is carried on the shaft of the angularly positioned roller 25. The angular positioning of this latter, as well as its slightly tapered contour at once starts to effect a change in the direction of travel of the tire mold or other article which has been frictionally fed thereonto toward the next angularly positioned roller, as 26. This latter carries at its outer end a bevelled gear wheel, as 38, whose teeth mesh with those of another bevelled gear wheel 39 similarly to the wheels 33 and 34 just mentioned, and this latter gear wheel 39 is in turn positively driven by the engagement over its sprocket wheel 40 of a second endless sprocket chain 41, which is carried coaxially upon the shaft of the roller member 27, which latter is operatively adjacent the receiving end of the second endless belt conveyer, as 31. The last named roller 27 deriving its rotative movement from the drum or sprocket wheels over which the receiving endless belt 31 travels, it and its companion angular roller 26 thus receive positive rotative actuation in the same direction as regards the travel of any selected point upon their peripheral surfaces as that followed by the tire mold or other article which has already been described as coming under the propulsive though angularly turning influence of the rollers 24 and 25. The influence upon the direction of travel of the tire mold or other article already started in an angular way in the manner described by the first obliquely positioned roller, as 25, is continued by the roller 26, so that by the time the tire mold or other article under conveyance has reached the next roller 27 adjacent the receiving end of the endless belt carrier 31 its direction of travel has been altered to so nearly a 90° variance from that in which it was preceding when it left the delivery belt 30 that it thereafter proceeds along the receiving endless belt unit 31 without guidance or corrective positioning. Indeed, provided these several rollers are adjusted in proper angularity to one another, and are rotatably actuated accordingly, it has been my experience in the installation and operation of apparatus such as is herein characterized that if such a skirting or fence as the element 23ª above mentioned were provided as an additional guide for the tire molds or other articles in following their intended direction of travel as effected by the elements herein described, it would rarely, if ever, be engaged by any of them.

It is therefore obvious that this change in the direction of travel of the tire molds motor assembly units or other articles can by the aid of my mechanism, be effected without any of the jarring or frictional contact against it, which has been heretofore noted as an objection to the former style of conveyer apparatus employed for this and analogous purposes, and it is of course obvious that with this element of friction removed, a correspondingly lesser total of actuative power is necessary for the endless belt conveyer elements as such.

The plan view showing in Figure 4 of a portion of a conveyer unit corresponds, in its showing of the long narrow ellipse 46 with the dotted line indication thereof in the upper left hand portion of Figure 1, and is designed to bring out the particular adaptability of my conveyer construction to the timed lifting and replacement of the tire molds by the separate and separately operable lifting tongs mechanism 47 illustrated in Figure 2. It will be noted, on reference to Figure 4, that the spaces 48 at either end of the conveyer section there shown are unoccupied by tire mold units such as are intermediately indicated at 49. These spaces, it will be further noted upon comparison with Figure 2, correspond in position with the drops or loops 50 in the tong conveyer system shown in the latter figure, at which points other process steps, not necessary here to describe are followed in the treatment of the tires, further steps of which as regards the path of travel of the tire molds handled by the tongs mechanism 47 is indicated by the portion 51 of the ellipse shown in Figure 4. While forming no part of my herein-claimed invention, these illustrations are included to show the adaptability of my improvement to cooperative use with other manufacturing mechanisms, and need not be looked upon as restricted in its utility to the tire-making art.

It is of course obvious that in place of the several rollers 24, 25, 26 and 27 deriving their rotative actuation from suitable operative connections with the drums or sprocket elements over which the endless conveyers travel, this suggested and described arrangement is offered only for the sake of simplicity of power arrangements and suitable timing correlation of the several parts. It should therefore be considered as fully within the scope of my invention to actuate these angularly turning rollers from a power source quite separate from that from which the endless conveyer elements derive their actuation.

What I claim is:

In combination, first and second conveyers arranged at angles to one another, each of said conveyers including a plurality of endless belts, horizontal curved supports positioned between the discharge end of the first conveyer and the leading end of the second conveyer, a first cylindrical roller journaled in said supports and positioned at the discharge end of the first conveyer, a prime mover arranged adjacent to the inner one of the curved supports, means positioned in close proximity to the inner support for directly driving the belts of the first conveyer and the cylindrical roller, first and second tapered rollers journaled in said supports and tapering toward the inner support, driving means for the first tapered roller connecting the outer end of that roller to the outer end of the cylindrical roller, driving means for the second tapered roller connecting the inner ends of the tapered rollers, a second cylindrical roller positioned at the leading end of the second conveyer, and means at the outer ends of the second tapered roller and second cylindrical roller for driving the second cylindrical roller and the belts of the second conveyer from the second tapered roller.

In testimony whereof I sign this specification.

WALTER V. HOEFEN.